United States Patent [19]
Diamond

[11] Patent Number: 5,575,508
[45] Date of Patent: Nov. 19, 1996

[54] METHOD AND APPARATUS FOR INHIBITING THE COPYING OF CHECKS AND NEGOTIABLE DOCUMENTS

[75] Inventor: Robert I. Diamond, Bothell, Wash.

[73] Assignee: Formtronics, Inc., Alpine, Utah

[21] Appl. No.: 333,542

[22] Filed: Nov. 2, 1994

Related U.S. Application Data

[63] Continuation-in-part of Ser. No. 241,798, May 12, 1994, Pat. No. 5,538,290, which is a continuation-in-part of Ser. No. 57,614, May 5, 1993, abandoned.

[51] Int. Cl.⁶ ..................................................... B42D 15/00
[52] U.S. Cl. ................................. 283/93; 283/58
[58] Field of Search .................... 283/58, 93, 57, 283/113, 114, 117, 72

[56] References Cited

U.S. PATENT DOCUMENTS

| | | | |
|---|---|---|---|
| 5,149,140 | 9/1992 | Mowry, Jr. et al. | 283/93 |
| 5,189,292 | 2/1993 | Batterman et al. | 283/93 X |
| 5,375,886 | 12/1994 | Tsuchiya | 283/93 |
| 5,487,567 | 1/1996 | Volpe | 283/93 X |

*Primary Examiner*—Willmon Fridie, Jr.
*Attorney, Agent, or Firm*—Michael A. O'Neil

[57] ABSTRACT

A method and apparatus for enhancing the security of a check or negotiable document and deterring the generation of copies of the check or negotiable document. The signature area of a document is imprinted with a pantographic background design different from a pantographic background design covering the remainder of the face of a check. A warning clause describes the color and/or background of the signature area. The endorsement area of a document is also imprinted with a pantographic background design. A warning clause describes the color and/or background of the endorsement area. The endorsement area background may further include a representation of the watermark certification seal to aid an individual in more quickly determining whether the proper watermark seal exist on the check or negotiable document.

13 Claims, 3 Drawing Sheets

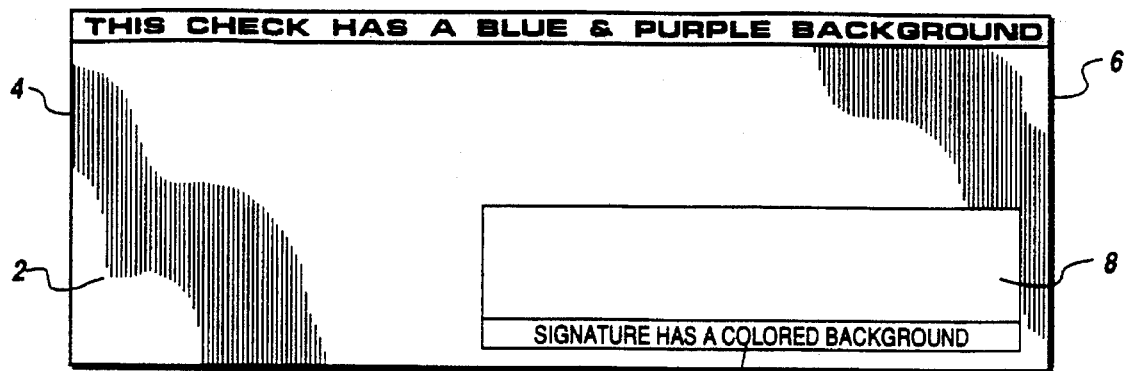
Fig.1
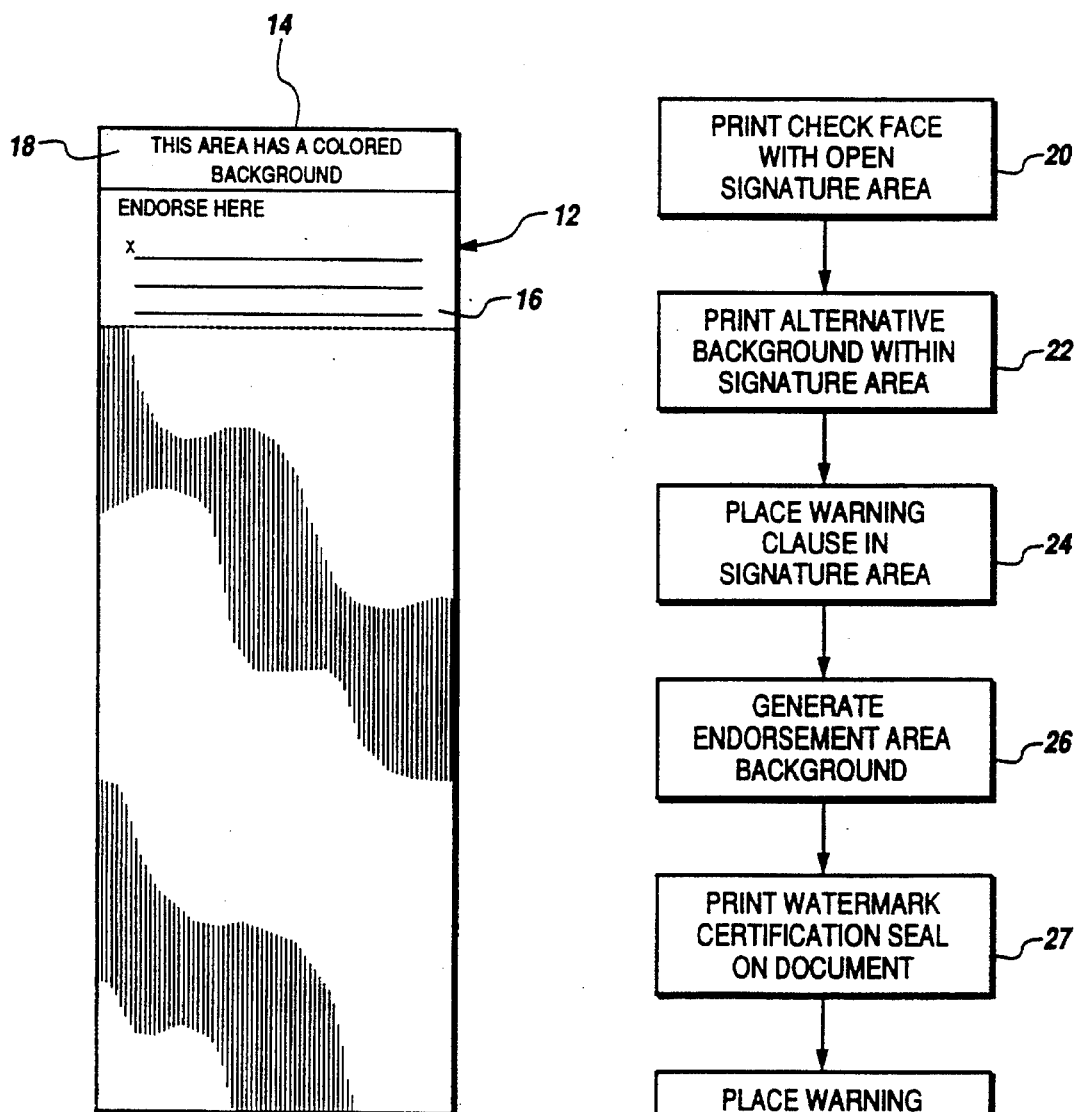
Fig.2
Fig.3

METHOD AND APPARATUS FOR INHIBITING THE COPYING OF CHECKS AND NEGOTIABLE DOCUMENTS

RELATED APPLICATION

This application is a continuation in part of U.S. Ser. No. 08/241,798 filed May 12, 1994 now U.S. Pat. No. 5,538,290 which is a continuation in part of U.S. application Ser. No. 08/057,614, filed May 5, 1993 now abandoned and entitled METHOD AND APPARATUS FOR INHIBITING THE COPYING OF CHECKS AND NEGOTIABLE DOCUMENTS.

TECHNICAL FIELD

This invention relates to a method and apparatus for check copying protection, and more particularly to a method and apparatus for protecting the check from copying by unauthorized individuals and for allowing an individual to quickly determine the validity of a check.

BACKGROUND OF THE INVENTION

A major problem within the check cashing industry is the increasing risks arising from the copying of checks by unauthorized individuals. These risks have increased due to the improved technology in the areas of copiers, computer aided design and desk top publishing. Advancements in these areas have created the ability to duplicate checks and other negotiable documents to such a high degree of accuracy that an individual receiving the check or negotiable document has difficulty in determining if the instrument is fraudulent.

A variety of methods have been implemented to protect against the unauthorized copying of checks and negotiable documents. These preventative methods have included the use of multi-colored check faces and specially designed check backgrounds that are not easily copied. Some manufacturers have utilized the placement of the word "void" in a muted design that normally blends in with the background of a check but becomes visible when the check is processed through a single or full color copier. Other manufacturers use a rainbow color scheme with graduated colors from blue to green or blue to purple across the face of a check or negotiable document. The rainbow color scheme makes the check more difficult to photocopy.

Another technique utilized to protect against fraudulent checks and negotiable documents is the placement of artificial watermark certification seals upon the check or negotiable document. The seals are only apparent to an individual when viewing a check or negotiable document from an angle. The watermark certification seals cannot be copied and a warning placed upon the check or negotiable document alerts an individual to the required presence of the watermark.

However, none of these security methods protect two particularly vital areas of a check or negotiable document. The most critical areas of a check or negotiable document are the signature area and the endorsement area on the back of the check. None of the methods to date have focused upon protection of these particularly vital areas. Another problem arises from the fact that the watermark certification seals placed upon the check or negotiable document are difficult to see, making it difficult for an individual cashing the check to easily determine whether the proper watermark seal is present. Thus, a need has arisen for a method and apparatus specifically protecting the vital signature and endorsement areas of a check or negotiable document and allowing an individual to more easily determine the presence of a watermark certification seal.

Another method utilized to deter duplication of checks or negotiable documents uses a pantograph design, having a different screen density and/or different lines per inch within the screen. This causes a difference in the size of the dots making up the design, but the differences are muted to the naked eye. Warning phrases and words, such as VOID, COPY, etc., are designed within the larger or smaller dots.

If a check or negotiable document using this feature is processed through a copier or other scanning device, the larger dots are copied, but the smaller dots are not copied. Thus, the phrase encoded within the differing size dots will appear in the copy. The degree of success of this procedure depends upon the pantograph design, the ink color, the screen density and the lines per square inch of the screen. However, current technological advances in copying devices allow various settings to be used upon the copying device. Thus, by iterative procedures, an unauthorized individual could adjust the settings of a sophisticated copying device to copy a check or negotiable document in such a manner that the encoded warning clause would not appear.

SUMMARY OF THE INVENTION

The foregoing and other problems are overcome by the present invention. The process generates a check or negotiable document wherein the signature area contains several verifications. These include a printed signature area background differing from the background design of the balance of the check. The signature area background may have a single or multi-color background. A warning clause describes the color and/or background design of the signature area, and is printed in a manner such that it is clearly visible prior to and after any unauthorized copying.

As part of the check printing process, verifications are included on the back of the check within the endorsement area. A background design, similar or different to the design on the front of the check, is printed within the check endorsement area. The design may be single or multi-colored and a warning clause is printed alerting payers of the check to the background and/or color scheme of the endorsement area, and is printed in a manner such that it is clearly visible prior to and after any unauthorized copying.

Within the check endorsement area of the check or negotiable document, a representation of the watermark certification seal is included as part of the backing. This allows a payer of the check to quickly determine the appearance of the watermark certification seals located upon the document, and thus, more easily locate the watermarks.

The problem of technologically advanced copiers being used to circumvent the muted warning clauses in a check background is overcome by utilizing a plurality of warning clauses formed of dot patterns having a differing size. A check backing would include a first warning clause comprised of a first sized dot pattern and one or more additional warning clauses having a differing size dot pattern. The differing size dot patterns are accomplished by using an additional pantograph design and/or multiple screens and lines per square inch within the background of the check or negotiable document. Surrounding the plurality of warning clauses is a background design having a pattern of dots of a third size.

BRIEF DESCRIPTION OF THE DRAWINGS

For a more complete understanding of the present invention and the advantages thereof, reference is now made to the following description taken in conjunction with the accompanying drawings in which;

FIG. 1 illustrates the front side of a check utilizing the signature area of the present invention;

FIG. 2 is an illustration of the back of a check utilizing the endorsement area of the present invention;

FIG. 3 is a flow diagram describing the process of the present invention;

DETAILED DESCRIPTION

Figure 4:
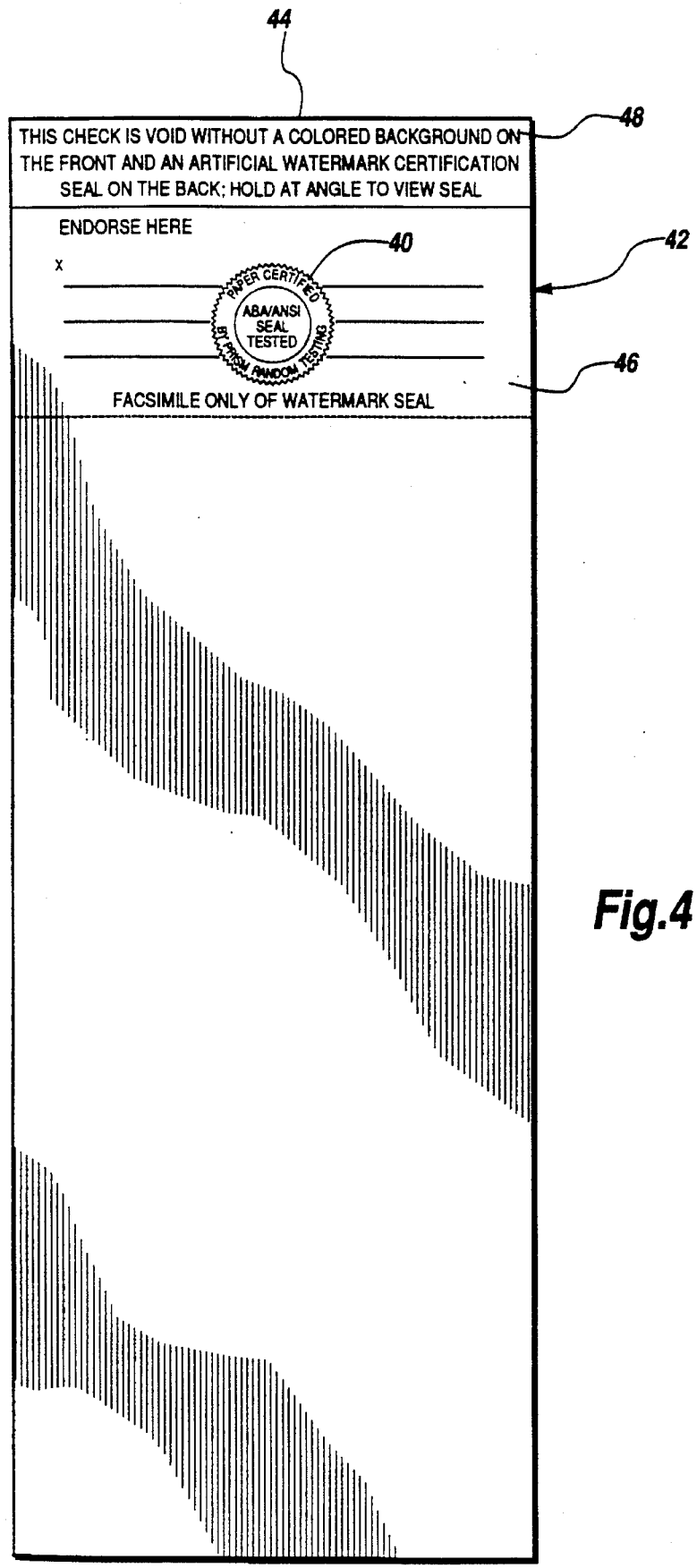
FIG. 4 is an illustration of an alternative embodiment of the back of a check having an endorsement area containing a representation of the watermark certification seals incorporated onto the check.

Referring now to the Drawings, and more particularly to FIG. 1, there is illustrated the front side of a check utilizing the signature area of the present invention. The check comprises a substantially rectangular sheet of paper having a check face 2, covered with a pantographic background design. As the pantographic background design proceeds from the left side 4 of the check to the right side 6 of the check, the color graduates from one color to other colors, for example, from blue to green or blue to purple. The signature area 8 of the check, comprises an area having a pantographic background design different from the design encompassing the majority of the face 2 of the check. Furthermore, as you proceed from the left side of the signature area to the right side of the signature area, a graduated color change can occur.

A warning clause 10 is placed in the signature area 8 indicating that the signature area has a colored background. The warning clause may also include an indication of the differing background within the signature area 8, refer to the presence of a watermark certification seal located somewhere on the check or describe any other relevant feature of the signature area. The warning clause 10 uses a background and print that is clearly visible prior to and after any unauthorized copying. In the preferred embodiment, this would be achieved by using a solid color background, as opposed to a pantographic background design, with the warning clause 10.

Referring now to FIG. 2, there is shown the back of a check having an endorsement area printed or manufactured in accordance with the present invention. The endorsement area 12 comprises an area located at the top edge 14 of the check. The face 16 of the endorsement area 12 is covered by a pantographic background design similar to the pantographic background design on the face 2 of the check. The pantographic background design may be a single color or alternatively, may have multi-colors fading from one color to the other colors across the face 16 of the endorsement area 12.

A warning clause 18 across the top of the endorsement area 12 describes the color and/or background of the endorsement area. The warning clause 18 may further describe any relevant aspect of the endorsement area 12 and the face of check 2. The warning clause 18 is printed using a background and print that is clearly visible prior to and after any unauthorized copying. In the preferred embodiment, this would be achieved by using a solid color background, as opposed to a pantographic background design, with the warning clause 18. While the description with respect to FIGS. 1 and 2 were made with respect to a check, it is to be understood that the invention is applicable to any negotiable document.

Referring now to FIG. 3, there is shown a block diagram illustrating the process of the present invention. The check face is printed at step 20. At step 22, the signature area is also printed with an alternative background and a color scheme similar to that of the remainder of the face of the check. At step 24, the warning clause is placed in the signature area of the check to describe the background and/or color of the signature area. The endorsement area background is generated at step 26 within the endorsement area to have a pantographic background design similar to the design on the front of the check. The watermark certification seal representation is printed on the check at step 27 to provide an individual with a quick reference as to the appearance of the watermark certification seals printed on the check. The representation will normally be placed within the endorsement area but this is not required. A warning clause is placed at step 28 in the endorsement area of the check to describe the background and/or color of the endorsement area.

Referring now to FIG. 4, there is shown an alternative embodiment of the present invention wherein a watermark certification seal representation 40 is incorporated into the background of the check endorsement area 42. As before, the endorsement area 42 comprises an area located at the top edge 44 of the check. The face 46 of the endorsement area 42 is covered by a pantographic background design similar to the pantographic background design on the front face 2 (FIG. 1) of the check. At some location within the endorsement area 42, the watermark certification seal representation 40 is included. The watermark certification seal representation 40 is a replica of the artificial watermark certification seals (not shown) placed upon other locations of the check or negotiable document. A notification 41 placed at the bottom of the endorsement area 42 notifies a user that the watermark certification seal representation 40 is only a facsimile of the actual watermark certification seal (not shown). By placing the watermark certification seal representation 40 within the endorsement area 42, an individual can quickly determine what they are looking for when trying to ascertain the existence of an artificial watermark certification seal in other locations on the check. As in FIG. 2 a warning clause 48 notifies users of various security features used on the check.

Figure 5:
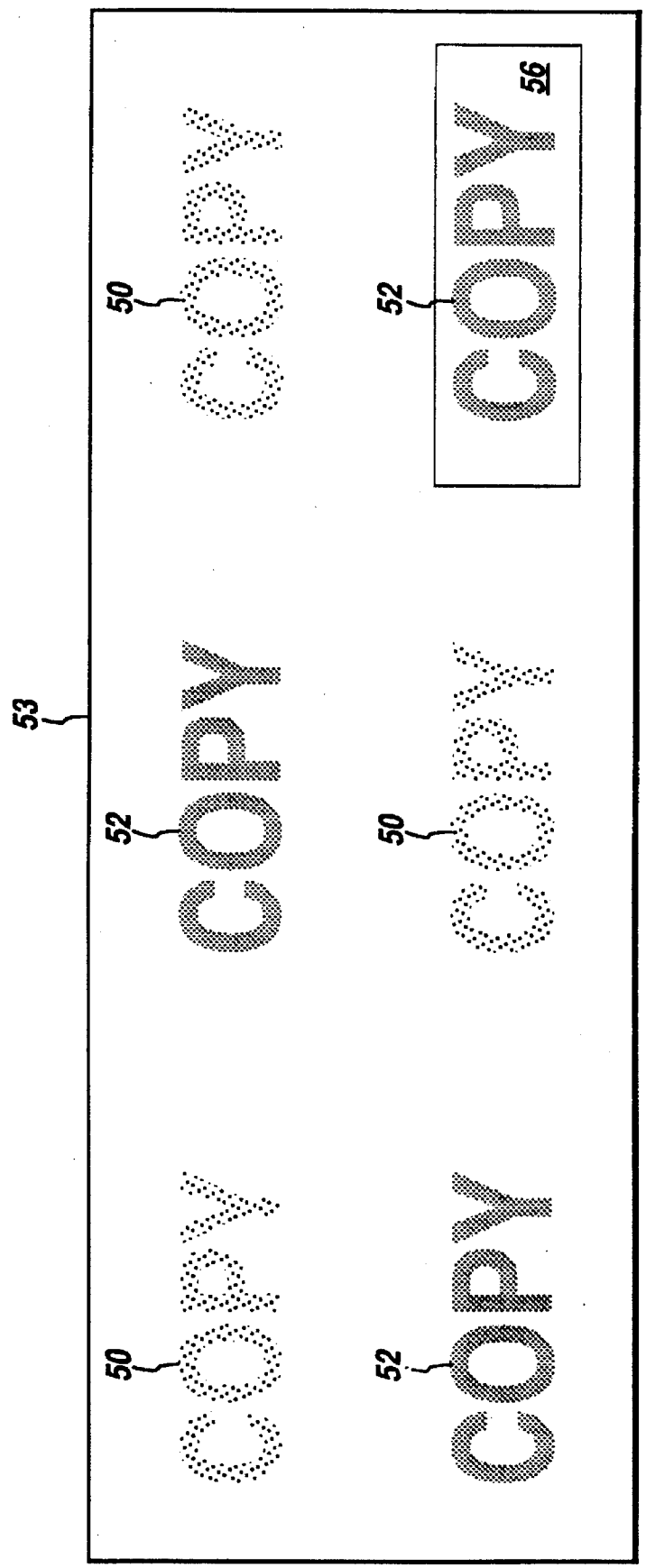
FIG. 5 is an illustration of a check having warning phrases of differing dot pattern sizes encoded in the background of the check.

Yet another method for protecting checks and negotiable documents is illustrated in FIG. 5, wherein muted warning phrases, such as VOID or COPY, are included within the background area of the check. Presently existing protection methods utilize known methods to create a warning phrase or group of warning phrases having a uniform number of line or dots per square inch. While this method protects a check or negotiable document from being copied on a majority of existing copying systems, many presently existing, more sophisticated copying systems may be set to a particular copying level such that the warning clauses would remain muted in a copied document.

Thus, the present invention utilizes a check or negotiable document incorporating warning phrases having two or more different types of line or dot densities upon the face of the check or negotiable document. A first group of warning phrases 50 uses a pattern of dots of a first size. Along with this first group of warning phrases is a second group of warning phrases 52 created from a different screen density and/or different lines per inch on the screen and having a pattern of dots of a second size. Surrounding the first and second groups of warning phrases (50, 52) is a background pattern 53 of dots having a third size. Generation of the warning clauses and background are accomplished using methods known in the art.

The differing warning phrases (50, 52) may be placed on different portions of the check or negotiable document. For example, the first group of warning phrases may be placed on the background of the majority of the document while the second group of warning phrases are placed in the background of the signature area 56. The differing groups of warning phrases (50, 52) may also be used within the same area of the check or negotiable document. By using a plurality of line or dot densities for the warning phrases (50, 52), an unauthorized individual will be unable to adjust a copier to mask a single warning phrase (50, 52) since the other warning phrase will still appear. Thus, the warning phrases will appear when copied on a greater number of copiers and copier settings than is possible using only a single line or dot density pattern.

Although preferred embodiments of the present invention have been illustrated in the accompanying Drawings and described in the foregoing Detailed Description, it will be understood that the invention is not limited to the embodiments disclosed, but is capable of numerous rearrangements, modifications and substitutions of parts and elements without departing from the spirit of the invention.

I claim:

1. A negotiable document having enhanced security for deterring generation of copies of the negotiable document, comprising:

a backing;

a first warning mark printed on the backing and comprised of a first dot size pattern;

a second warning mark printed on the backing and comprised of a second dot size pattern; and a background pattern printed on the backing and surrounding the first and second warning marks, said background pattern comprising a third dot size pattern.

2. The negotiable document of claim 1 further including:

an endorsement area on a first side of the backing for endorsing the negotiable document; and a pantographic background design substantially covering the endorsement area of the negotiable documents, said pantographic background design having a single color.

3. The negotiable document of claim 2, wherein the pantographic background design is multicolored.

4. The negotiable document of claim 2, wherein the endorsement area further includes a warning clause describing the pantographic background design of the endorsement area.

5. The negotiable document of claim 4, wherein the warning clause describes the color of the pantographic background design.

6. The negotiable document of claim 1 further including:

a signature area on a second side of the backing; and a pantographic background design substantially covering the signature area and differing from a pantographic background design on the second side of the backing.

7. The negotiable document of claim 6, wherein the pantographic background design of the signature area is multicolored.

8. The negotiable document of claim 6, wherein the signature area further includes a warning clause describing the pantographic background design of the signature area.

9. The negotiable document of claim 8, wherein the warning clause describes the color of the pantographic background design.

10. A method for enhancing security of a negotiable document and deterring copying of the negotiable document, comprising the steps of:

generating a first warning mark on a negotiable document backing, said first warning mark comprised of a first dot size pattern reproducible by various copier systems;

generating a second warning mark on the negotiable document backing, said second warning mark comprised of a second dot size pattern reproducible by various copy systems; and generating a background pattern around the first and second warning marks, said backing pattern comprised of a third dot size pattern reproducible by various copy systems.

11. The method of claim 10 further including the steps of:

printing a first pantographic background design within a signature area on a first side of a negotiable document;

printing a second pantographic background design substantially covering a first side of the negotiable document and differing from the first pantographic background design; and generating a warning clause describing the pantographic background design of the signature area.

12. The method of claim 10, further including the step of printing a pantographic background design within an endorsement area on a second side of the negotiable document.

13. The method of claim 12, further including the step of generating a warning clause describing the pantographic background design within the endorsement area.

\* \* \* \* \*

UNITED STATES PATENT AND TRADEMARK OFFICE
CERTIFICATE OF CORRECTION

PATENT NO. : 5,575,508
DATED : November 19, 1996
INVENTOR(S) : Robert I. Diamond It is certified that error appears in the above-indentified patent and that said Letters Patent is hereby corrected as shown below:

Title page, item [73], Assignee: Delete "Formtronics, Inc., Alpine, Utah."
Title page, item [57], Abstract, line 14, replace "exist" with--exists--.

Signed and Sealed this

Sixth Day of May, 1997

*Attest:*

BRUCE LEHMAN

*Attesting Officer*     *Commissioner of Patents and Trademarks*